April 19, 1966 C. A. TOCE 3,246,462
BATTERY OPERATED PARKING METER TIMING DEVICE
Filed July 25, 1962 4 Sheets-Sheet 1

INVENTOR
Charles A. Toce

BY
HIS ATTORNEY

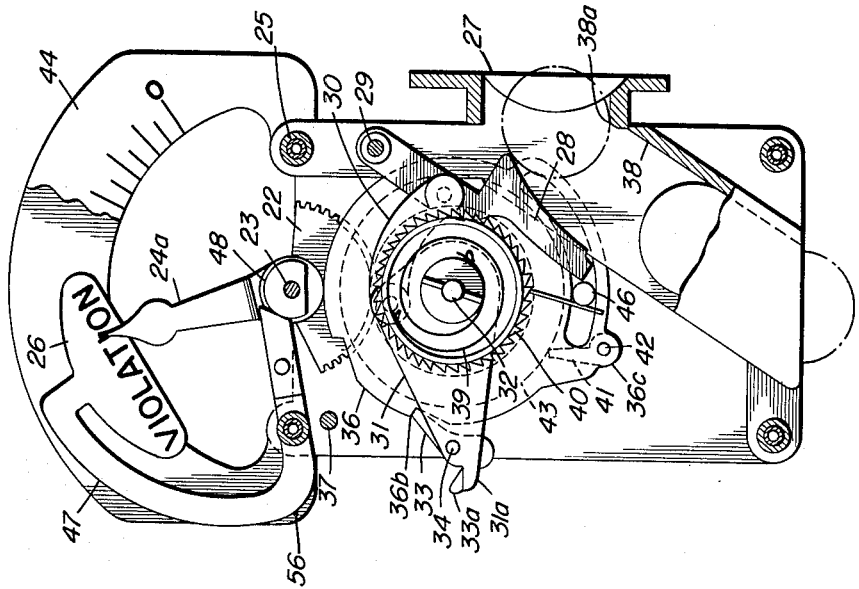
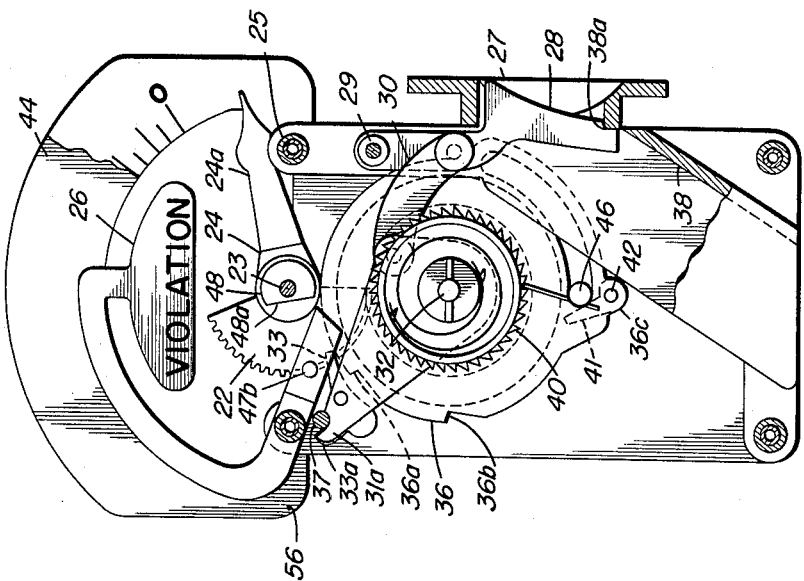

April 19, 1966   C. A. TOCE   3,246,462
BATTERY OPERATED PARKING METER TIMING DEVICE
Filed July 25, 1962   4 Sheets-Sheet 3

INVENTOR
Charles A. Toce
BY
HIS ATTORNEY

United States Patent Office 3,246,462
Patented Apr. 19, 1966

3,246,462
BATTERY OPERATED PARKING METER
TIMING DEVICE
Charles A. Toce, Sunland, Calif., assignor to Horological
Electronics Corporation, a corporation of Texas
Filed July 25, 1962, Ser. No. 212,221
4 Claims. (Cl. 58—141)

My invention relates to timing devices, particularly parking meters for the control of a parking space for automotive vehicles, and the like.

One of the objects of my invention is the provision of a timing device which is of simple, rugged and comparatively inexpensive construction which is suited to the timing of a parked vehicle with minimum effort on the part of the operator of the vehicle to place the same into operation and with maximum assurance of proper and exact timing of the vehicle parked.

Another object is the provision of a timing device, especially a parking meter, which is of such construction that a minimum of attention by city attendants is required to maintain the meter in operation under the varying conditions of summer heat and winter cold, of the dust and winds of summer and the driving rains, ice and the like of winter.

A further object is the provision of a parking meter, or other timing device, in which the timing effect is continuous, day or night, and in which the timing signal and required operating parts are merely connected in engagement upon actuation by a vehicle operator and taken out of engagement upon completion of the timing period, thus assuring dependable operation with minimum expenditure of effort by the operator and with this effort largely confined to the matter of setting the meter signal and the like.

Other objects of my invention will be obvious in part and in part pointed out in the description which follows.

My invention accordingly consists in the combination of elements, features of construction and arrangement of parts as described herein, illustrated in the accompanying drawings, and particularly set forth in the claims at the end of this specification.

In the accompanying drawings there is illustrated a timing device, particularly a parking meter, embodying certain features of my invention in which drawings.

Figure 1:
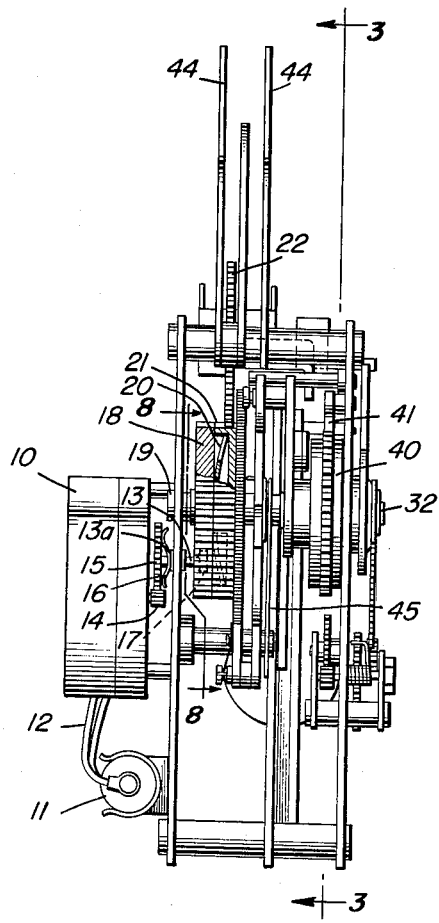
FIG. 1 is a side elevation view of the actual mechanism of the meter according to my invention, with certain parts broken away to better illustrate others.
Figure 2:
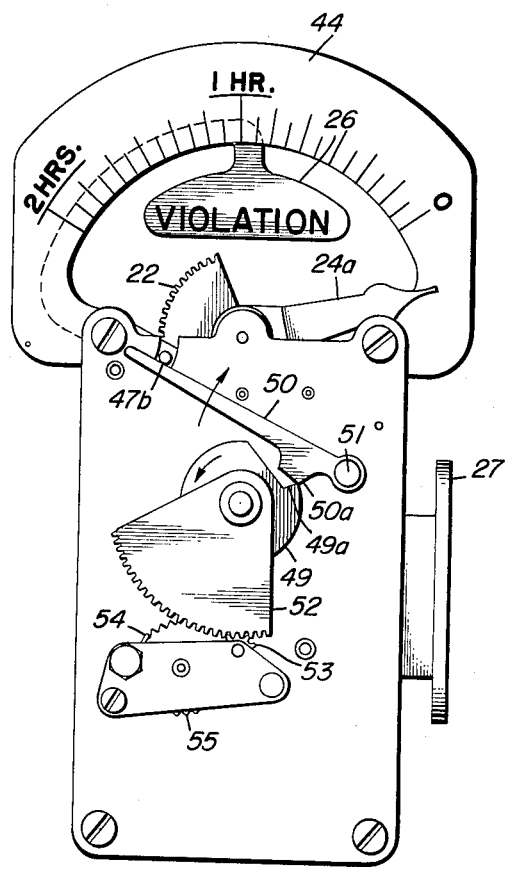
FIG. 2 is a front elevation of the meter mechanism of FIG. 1 in its position of rest with the parking time fully expired and the violation signal showing.
Figure 7:
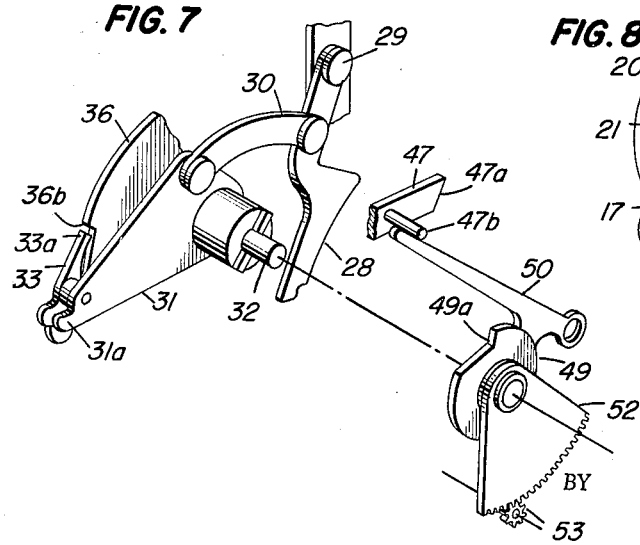
Figure 8:
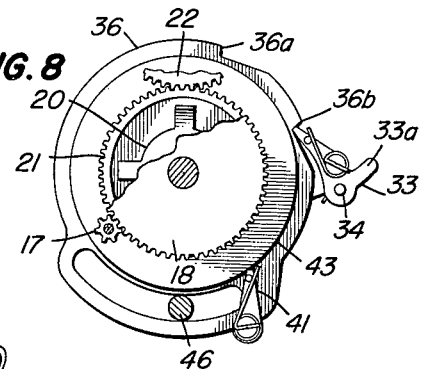
Figure 5:
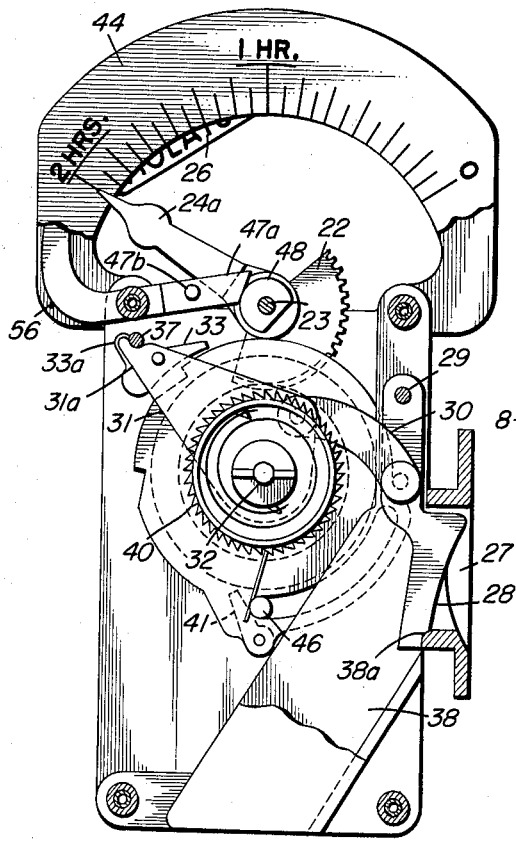
Figure 10:
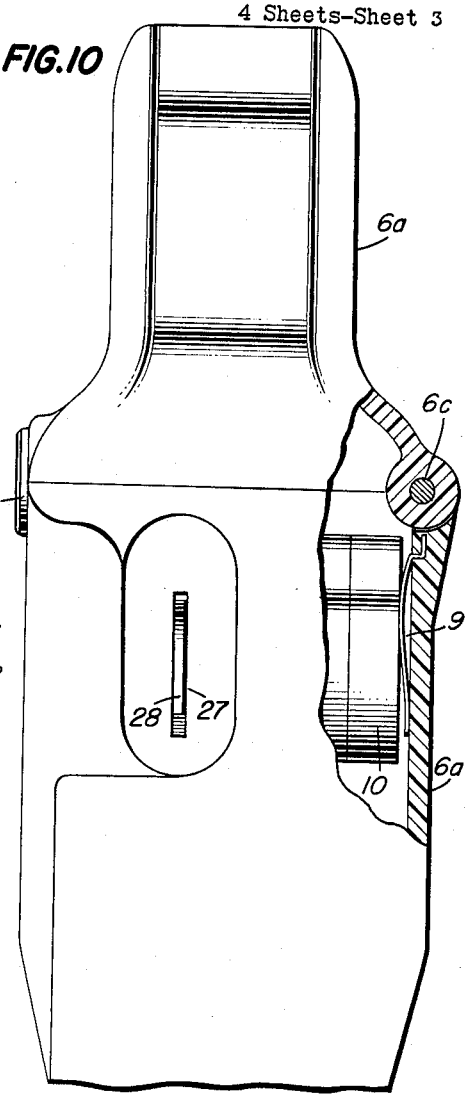
Figure 9:
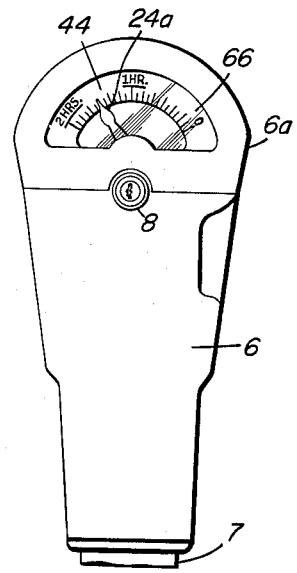
Figure 6:
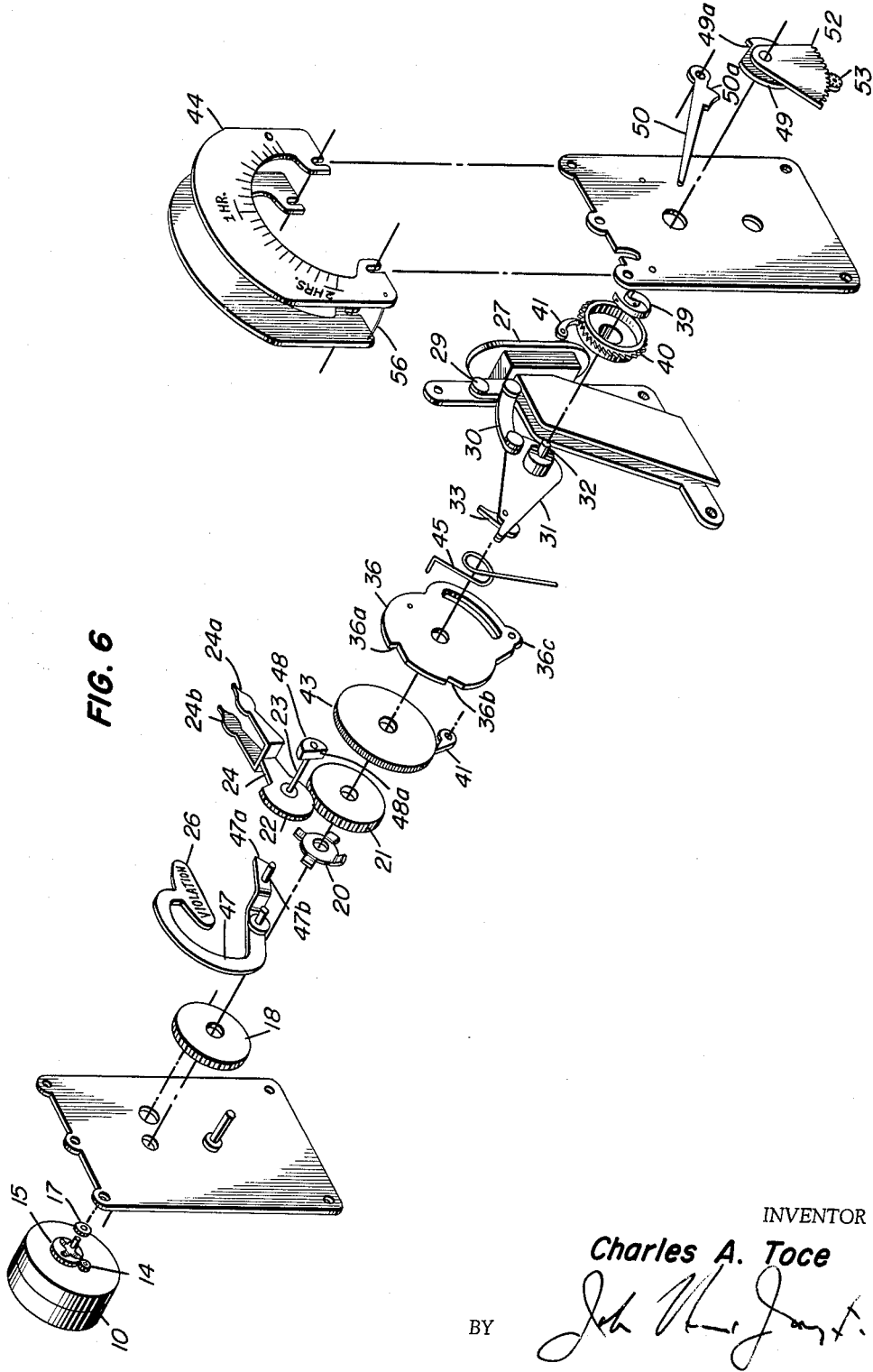

FIGS. 3, 4 and 5 are front elevation views of the meter mechanism of FIG. 2 as seen in the direction 3—3 of FIG. 1 in three different positions of operation: just before an actuating coin has been introduced; with almost complete introduction of the coin; and full setting of the meter for operation for a 2-hour period, respectively; in these several views certain parts have been broken away in order to better illustrate other parts;

FIG. 6 is an exploded view of the mechanism of my parking meter as seen in perspective, this for purposes of illustration;

FIG. 7 is a detail perspective view on an enlarged scale of the meter linkages called into play in setting the meter;

FIG. 8 is a detail back elevation view of the meter mechanism of FIG. 1 as seen in the direction 8—8 of that figure, with certain parts being broken away in order to better illustrate others;

FIG. 9 is a front elevation view on much reduced scale of the meter of my invention wherein the mechanism illustrated in the other figures is housed within a suitable case or housing; and FIG. 10 is a side elevation view, on the scale of FIGS. 1–5, of the meter housing of FIG. 9, with a certain portion thereof broken away to reveal a part of the mechanism.

Like reference characters denote like parts throughout the several views of the drawing.

As conducive to a better understanding of certain features of my invention it may be noted that parking meters and like timing devices have now become well established as a means of orderly, efficiently and reliably monitoring a parking berth in city street, at the curb line, in city or private parking lots, or in other urban or suburban areas. They are now well accepted by all. These meters not only monitor a parking berth but they also provide a great source of revenue for the city, municipality, etc.

Now I find that of the many parking meters on the market today it is the so-called automatic meter which is of greatest favor, with the so-called manual meter enjoying somewhat lesser acceptance. But the automatic meter, a meter merely requiring the introduction of a coin by a vehicle operator in order to place the meter into operation, i.e., set the meter, is subject to the fault that should a city attendant neglect to periodically wind the meter there is no power to complete the setting operation. The unwound meter still shows a violation of parking time. The vehicle operator is in a quandary. And when it becomes evident to all that the meter is not working, the city suffers a loss of revenue.

The manual meter is under the disability of requiring a substantial winding effort by the vehicle operator. And there is the possibility of the winding handle or lever slipping from the grasp in winding. Perhaps of even greater consequence, however, operation of the manual meter usually is a two-handed operation; i.e., insertion of the actuating coin with one hand and turning the winding handle or lever, to effect winding of the timing clock and setting of the timing pointer and violation signal to a non-violation position, with the other hand. This, of course, is most inconvenient when one hand is being used to carry a bundle, a handbag, or the like. And in winter there is even greater inconvenience as a result of the cold.

Accordingly, among the objects of my invention is the provision of a parking meter or other timing device in which the inadequacies of the prior art meters are successfully overcome; in which operation of the timing mechanism is assured, without reliance on a city attendant; in which the public is spared the necessity of winding the meter mechanism; and in which ready and accurate setting is assured.

Referring now more particularly to the practice of my invention, and having reference to the accompanying drawings, I provide an electronic meter encased in housing 6 (see FIGS. 9 and 10) mounted on a standard 7 at a street curb-line, for example (not shown here). The top portion of the housing is thinned out as at 6a and provided with windows 66 (FIG. 9) to reveal, front and back, the timing pointers 24a and 24b moving across the timer scale 44. Access to the meter mechanism is had by way of the hinged top 6a of housing 6. When unlocked as at lock 8, the top swings open on hinge 6c.

The meter of my invention is put into operation upon insertion of a suitable coin in coin slot 27 (see FIG. 10). The coin is pushed against the surface 28 of an arm suitably pivoted at 29 (see FIG. 3, for example). Following actuation of the meter, the coin is thrust by the arm down coin shute 38 and into a coin receptacle (not shown) where it is recovered by a city attendant on his rounds.

Now the electronic parking meter mechanism essentially consists of a timing device, a coin-handling slot mechanism and appropriate timing signal and an appropriate violation signal. The timing device, itself, comprises an electric clock 10 (see FIGS. 10 and 1) with a small electric battery 11 operating the clock through suitable electrical connections 12. The clock runs continuously as distinguished from prior art meters, the timing device being connected and disconnected when the meter is put into operation and when it is taken out of operation. The clock operates 24 hours a day. The motor employed conveniently is a 1.5 volt D.C. motor operating from a mercury hearing-aid battery and acting through appropriate gears and escape mechanism.

The power from the timing device is applied to hollow meter shaft 13 by way of pinion gear 14 and meshing gear 15, spring washer 16, which spring washer frictionally engages the expanded end 13a of the hollow shaft in slip-clutch relation.

The electric clock, as previously indicated, runs continuously with the result that power constantly is applied to the meter shaft 13 by way of frictional clutch 16 engaging therewith. When the meter itself is at rest there is slippage at the clutch. When the meter is in operation, however, movement of the timing pointer is had, as noted below, by way of movement of pinion gear 17 engaging large gear 18 positioned on shaft 19 secured in the meter frame. This gear, by way of spring washer 20, is frictionally coupled with large gear 21 with which a segmental gear 22 enmeshes. The segmental gear 22 is mounted on shaft 23 supported in the meter frame. It is the back portion of the segmental gear to which timing pointers 24a and 24b are secured (see, for example, FIGS. 2 and 6).

In its position of rest the parking meter (see FIG. 3) has timing pointers 24a, 24b stopped against stud 25 of the meter frame. The violation signal 26 is in full display. The electric clock is running, as previously noted.

Upon initial insertion of a coin into coin slot, for example a nickel or a penny, the coin immediately contacts the coin camming arm or gate 28 which is pivotally supported at 29. As seen in FIG. 4 of the drawings the coin pressing against the camming surface of arm or gate 28 swings the same in a counterclockwise direction, carrying with it the pivotal arm 30 which effects counterclockwise movement of the arm 31 pivoted on central shaft 32. Further movement of the coin and gate 28, the coin rolling over sill 38a of coin slot 38, continues the counterclockwise movement of arm 31 as seen, for example, in FIG. 4 with its pawl 33 mounted on pin 34 near the extreme end 31a of the arm. Pawl 33 under action of the spring 35, is maintained in contact with the peripheral edge of cam plate or cam disc 36. (In its position of rest it is to be noted that the pawl 33 is lifted above and out of contact with the peripheral edge of plate or disc 36 by virtue of the contact of the pawl protuberance 33a striking and holding against the pin 37 on the meter frame.)

As movement of the coin-cammed arm or gate 28 continues to the point that the coin slips beyond the cam surface and coin chute sill 38a and then glides down the coin chute 38 (see FIG. 4) the gate 28, with linkage 30, and arm 31, are at their extreme operative positions, this being determined by the diameter of the actuating coin. (The operative position shown in FIG. 4 is reached with a nickel as the actuating coin.) From that position their motion is reversed; they are moved in a clockwise direction under the action of spring 39 coiled about central shaft 32 and maintained in cylindrical housing 40 having an outside row of gear teeth which engage the pawl 41 mounted on the meter frame. (It is by way of the toothed housing 40 that the desired tension is put on the actuating arm 31. And it is the tension in the spring 39 which, reacting back through arm 31, linkage 30 and coin camming arm or gate 28, that desired effort is established for coin actuation or coin setting of the meter.)

With the reverse movement noted the pawl 33 engages in the appropriate step 36b provided on the periphery of cam disc 36. (When a penny is employed as the actuating coin instead of a nickel, the camming arm 28 is moved to a lesser extent because of the smaller diameter of the penny as compared with that of a nickel, and arm 31 is moved to a lesser extent in counterclockwise direction, with the result that when the coin slips over the coin chute sill 38a and beyond the camming surface of the arm 28 the pawl 33 engages with the step 36a on the camming plate, rather than the more remote step 36b.)

As movement of arm 31 continues in clockwise direction under the action of spring 39, the camming plate or disc 36 is moved further in a clockwise direction by virtue of the action of pawl 33 against cam step 36b. This movement has the effect of bringing the pawl 41, which is mounted on an extension 36c of plate 36 by suitable pin 42, into contact with the finely toothed plate or gear 43 (see FIGS. 4 and 6), and moving that gear in clockwise direction (the gear 43, like the gears 18 and 21, is mounted on shaft 19). This movement of gear 43 by the ratchet or pawl 41 serves to move the gear 21 with its engaging segmental gear 22 and timing pointer 24. Of course, the clockwise movement of the gear 21 along with the ratchet-operated gear 43 effects a counterclockwise movement of pointer 24, this carrying the timing pointer toward initial timing position. The arm 31 continues its movement in clockwise direction until its extreme end 31a strikes the stop 37 (see FIG. 5). This concludes the movement of arm 31 in a clockwise direction. This movement, by way of pawl 33, cam plate 36, further pawl 41, finely toothed gear 43, associated gear 21 and segmental gear 22, sets the timing pointer to the appropriate position on dial 44. Illustratively, this would be the 1-hr. position for a single nickel or the 2-hr. position for two successive nickels as explained below.

Upon arm 31 reaching the end of its movement by striking stop 37, the end 33a of the pawl 33 carried by the arm 31 also strikes stop 37. The pawl is thereby lifted from contact with cam plate 36, and that plate under the action of the coil spring 45 positioned on shaft 32 and engaging with arm 31 and the cam plate, is sharply moved in counterclockwise direction back to its initial position or position of rest, with pawl 41 striking stop 46 and lifting the same out of engagement with finely toothed gear 43 (see FIG. 5). The same setting operation may be repeated with a further nickel, this having the effect of setting the timing pointer at the two-hour (2-hr.) period, as seen in FIG. 5.

Timing pointer 24 is now moved in clockwise direction at timing rate by action of the timing device, or clock, acting through spring clutch 16, pinion gear 17, large engaging gear 18, spring clutch 20, large gear 21 and meshing segmental gear 22. The power requirement is at a minimum, the friction involved largely being that between the several gears, that between the three large gears and their supporting axial shaft, and the segmental gear with pointer and its supporting shaft.

So much for the setting of the timing pointer and its start of the timing function. Consider now the violation signal. In this connection a further part of the action of arm 31 under the effort of the introduction of an actuating coin and its movement of cam arm 28 and linkage 30 connected to arm 31, is the turning of the shaft 32 and the further cam plate 49 (see FIGS. 2, 6 and 7). This motion is in counterclockwise direction. Movement of the further camming plate effects a lift of arm 50 pivoted to the frame as at 51, this by virtue of camming action of step 49a lifting against the camming protuberance 50a. In this action the arm 50 is moved in counterclockwise direction and strikes against pin 47b of the violation signal arm 47. It moves the arm in counterclockwise direction and lifts the signal 26 out of the violation position shown in FIG. 2 into an obscure position as shown in FIG. 5.

In that action the tip 47a of the arm of the violation signal passes by the collar 48 mounted on the timing pointer shaft by way of the flat spot 48a provided on the collar. And as previously noted, when the timing pointer 24 is brought to the initiation of timing position, the tip 47a of the violation signal rides along the surface of the collar, thus maintaining the violation signal in obscured position.

When arm 31 returns to its position of rest, following completion of the coin action on coin camming arm 28 and linkage 30, as discussed above, the cam 49 returns to its initial position wherein arm 50 drops under the action of gravity, the camming protuberance 50a falling into the camming surface 49a of the arm 49.

The action occurring as the coin slips beyond the sill of coin chute 38 and the opposing surface of camming arm 28 is very quick under the action of spring 39 and its housing 40. This action sharply raises arm 31 by moving it in clockwise direction. To minimize the strain on the meter and the jarring of arm 31 against stop 37, the return movement of the arm is slowed down by the action of the segmental gear 52 operating on pinion 53 and a train of gears with a spring finger 54 riding on the toothed wheel 55 (see FIG. 2). This system effectively serves as a governor.

As movement of the timing pointer 24 continues at timing rate, the amount of parking time remaining being registered by the position of pointer ends 24a and 24b on the timing dial 44, the violation signal 26 remains in its obscured position away from the meter windows 66 of FIG. 9. Actually, the violation signal is just barely perceptible but in no wise effective (see FIGS. 4 and 5 for example). With still further movement of the timing pointer and as this progresses to expiration of the parking period and beyond, as shown in FIG. 2, the cam 48 rotates to the point that the arm 47a supporting the violation signal 26 slips across the flat surface 48a of the cam and the violation signal drops under the action of gravity. The violation signal is thus fully exposed (see FIGS. 2 and 3) and full expiration of the timing period and an allotted overtime period is clearly shown. The meter operation is at an end although, as indicated above, the timing mechanism continues to function, slippage taking place at the spring clutch 16 between clock train gear 15 and the expanded end of shaft 13 for driving the timing gears and pointer.

It will be seen that I provide in my invention a timing device, more especially a parking meter, in which the various objects hereinbefore set forth, and many practical advantages thereof, are successfully achieved. The device, or meter, is comparatively simple and inexpensive in construction. It employs a minimum number of moving and wearing parts. By reason of its continuously operating clock, the meter enjoys an assurance of operation with a minimum of effort on the part of a vehicle operator to place the same in operation (mere insertion of a coin) and virtually no attention by a city attendant (a change of electric battery every six months or year, depending upon battery size). The meter is light in weight, easily packed and shipped, and readily installed for operation with a minimum of adjustment necessary.

As many possible embodiments may be made of my invention, and as many changes may be made in the embodiment hereinbefore set forth, it will be understood that all matter described herein, or shown in the accompanying drawings, is to be viewed as illustrative and not as a limitation.

I claim as my invention:

1. A parking meter comprising in combination, a housing; in which housing there is encased continuously operating clock means; an electric battery connected thereto for continuously operating the same; timing means with timing pointer; a timing scale adjacent said timing pointer; slip-clutch means interconnecting said clock means and said timing means for continuously urging the timing means into operation; means restraining operation of said timing means upon reaching an end of predetermined timing period; violation signal means actuated by said timing means for signalling such end of timing operation by said timing means; and means actuated by an operator for setting said timing pointer at predetermined initial operating position with respect to said scale against the action of said clock means and said slip-clutch means, bringing said timing means into operation by said clock means, and setting said violation signal means into non-violation position.

2. A parking meter comprising, in combination: a continuously operating clock means; timing means including a timing pointer; slip-clutch means interconnecting said clock means and timing means; means for restraining operation of said timing means upon reaching an end of predetermined timing period; and means actuated by an operator for setting said pointer at predetermined initial timing position against the action of said clock means and slip-clutch means and then bringing said timing means into operation by said clock means, said actuated means including cam disc means with pawl mounted thereon and toothed gear engaged by said pawl and connecting with said timing means for setting said timing pointer at a position depending upon the extent of total movement of said cam disc means.

3. A parking meter comprising, in combination; a continuously operating electric clock means; timing means including a timing pointer; slip-clutch means interconnecting clock means and timing means for continuously urging the same into operation; stop means contacted by said timing pointer for arresting operation of the time means upon reaching an end of timing operation; violation signal means actuated by said timing means for signalling such end of timing operation; and means actuated by an operator for taking said pointer out of contact with said stop means, setting the same at predetermined initial operating position, bringing said timing means into operation by said clock means and setting said violation signal into a non-violation position, said actuated means including cam disc means with pawl mounted thereon and toothed gear engaged by said pawl and connecting with said timing means for setting said timing pointer at a position depending upon the extent of total movement of said cam disc means.

4. A parking meter comprising, in combination: continuously operating clock means; timing means; slip-clutch means interconnecting said clock means and said timing means; means restraining operation of said timing means beyond a predetermined timing position; means for setting said timing means against the action of said clock means and slip-clutch means to initial predetermined timing position; violation signal means actuated by said timing means for signalling an end to timing operation; and means for bringing said violation signal means out of signal position including cam means connecting with said setting means and an arm actuated by said cam means for moving the signal means away from signalling position upon setting said timing means to initial timing position.

References Cited by the Examiner

UNITED STATES PATENTS

| | | | |
|---|---|---|---|
| 2,221,578 | 12/1940 | Gabrielson | 194—83 |
| 2,259,985 | 10/1941 | Arey | 194—83 |
| 2,571,185 | 10/1951 | Bates | 58—39.5 X |
| 2,596,124 | 5/1952 | Broussard | 58—141 |
| 2,603,288 | 7/1952 | Sollengerber. | |
| 2,613,792 | 10/1952 | Broussard | 194—72 |
| 2,625,250 | 1/1953 | Hale | 194—83 |
| 2,631,710 | 3/1953 | Hale | 194—72 |
| 2,695,090 | 11/1954 | Broussard et al. | 194—72 |
| 2,736,414 | 2/1956 | Gaddis | 58—39.5 X |
| 2,752,924 | 7/1956 | Broussard | 194—83 |
| 3,158,987 | 12/1964 | Hamilton | 58—39.5 X |

LEO SMILOW, *Primary Examiner.*

SAMUEL F. COLEMAN, *Examiner.*